US012592494B2

(12) United States Patent　(10) Patent No.:　US 12,592,494 B2
Rossanese et al.　(45) Date of Patent:　Mar. 31, 2026

(54) RECONFIGURABLE INTELLIGENT SURFACE, RIS, WITH SENSING CAPABILITIES AND METHOD FOR OPERATING THE SAME

(71) Applicant: NEC Laboratories Europe GmbH, Heidelberg (DE)

(72) Inventors: Marco Rossanese, Heidelberg (DE); Placido Mursia, Heidelberg (DE); Andres Garcia-Saavedra, Heidelberg (DE); Vincenzo Sciancalepore, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/852,518

(22) PCT Filed: Oct. 20, 2022

(86) PCT No.: PCT/EP2022/079290
§ 371 (c)(1),
(2) Date: Sep. 30, 2024

(87) PCT Pub. No.: WO2024/027945
PCT Pub. Date: Feb. 8, 2024

(65) Prior Publication Data
US 2025/0105527 A1　Mar. 27, 2025

(30) Foreign Application Priority Data
Aug. 1, 2022　(EP) ..................................... 22188132

(51) Int. Cl.
*H01Q 15/14*　(2006.01)
*H01Q 3/46*　(2006.01)
(Continued)

(52) U.S. Cl.
CPC ............. *H01Q 15/148* (2013.01); *H01Q 3/46* (2013.01); *H04B 7/04013* (2023.05); *H04B 17/364* (2015.01); *H04B 7/0617* (2013.01)

(58) Field of Classification Search
CPC .... H01Q 15/148; H01Q 3/46; H04B 7/04013; H04B 7/0617; H04B 17/364
See application file for complete search history.

(56) References Cited

U.S. PATENT DOCUMENTS 12,212,380 B2 * 1/2025 Akhoondzadehasl ...................... H04B 7/0413
2021/0344384 A1 * 11/2021 Dunna ..................... H01Q 3/32
(Continued)

FOREIGN PATENT DOCUMENTS

CN　114785391 A　7/2022
JP　2022106228 A　7/2022

OTHER PUBLICATIONS

Marco Rossanese et al, "Designing, Building, and Characterizing RF Switch-based Reconfigurable Intelligent Surfaces", arxiv.org, Cornell University Library, 201 Olin Library Cornell University Ithaca, NY 14853, Jul. 14, 2022 (Jul. 14, 2022), XP091271819, pp. 1-10.
(Continued)

*Primary Examiner* — Seokjin Kim
(74) *Attorney, Agent, or Firm* — Leydig, Voit & Mayer, Ltd.

(57)　ABSTRACT
A reflective device includes a control element and an array of reflective elements. Each reflective element of the array of reflective elements has an antenna element and a phase shifter and is under control of the control element so as to reflect a radio-frequency (RF) signal incident on the each reflective element with an adjustable phase shift, where different phase shifts are realized by the phase shifter channeling the RF signal into a specific one of a number of
(Continued)

different delay lines. Each of the different delay lines includes an extension unit configured to extract a portion of a power of the RF signal channeled into the respective specific one delay line by the phase shifter and to measure or estimate the voltage, the current and/or the power of the extracted portion of the RF signal.

15 Claims, 6 Drawing Sheets

(51) Int. Cl.
    *H04B 7/04*          (2017.01)
    *H04B 17/364*    (2015.01)
    *H04B 7/06*         (2006.01)

(56)                 References Cited

U.S. PATENT DOCUMENTS

| | | | |
|---|---|---|---|
| 2023/0276255 A1* | 8/2023 | Iwabuchi | H01Q 3/46 |
| | | | 342/367 |
| 2024/0250746 A1* | 7/2024 | Gunzelmann | H04B 7/024 |
| 2025/0202539 A1* | 6/2025 | Hemadeh | H04J 11/0079 |

OTHER PUBLICATIONS

George C Alexandropoulos et al, "Hybrid Reconfigurable Intelligent Metasurfaces: Enabling Simultaneous Tunable Reflections and Sensing for 6G Wireless Communications", arxiv.org, Cornell University Library, 201 Olin Library Cornell University Ithaca, NY 14853, Apr. 10, 2021 (Apr. 10, 2021), XP081934778, pp. 1-8.

* cited by examiner

RECONFIGURABLE INTELLIGENT SURFACE, RIS, WITH SENSING CAPABILITIES AND METHOD FOR OPERATING THE SAME

CROSS REFERENCE TO RELATED APPLICATIONS

This application is a U.S. National Phase application under 35 U.S.C. § 371 of International Application No. PCT/EP2022/079290, filed on Oct. 20, 2022, and claims benefit to European Patent Application No. 22188132.9, filed on Aug. 1, 2022. The International Application was published in English on Feb. 8, 2024 as WO 2024/027945 A1 under PCT Article 21(2).

FIELD

The present invention relates to a reflective device and to a method for operating the same.

BACKGROUND

Reflective devices known as Reconfigurable Intelligent Surfaces (RISs), sometimes also referred to as Intelligent Reconfigurable Surface (IRS), are one of the most promising disrupting technologies for the upcoming cellular network generations. In short, RIS are radio-frequency (RF) reflectors whose response to impinging signals is programmable from a centralized controller. In particular, their ability to backscatter or phase-shift the impinging electromagnetic waves makes the wireless radio channel a variable to be optimized rather than a black box to be mitigated.

A Reconfigurable Intelligent Surface (RIS) is essentially a planar structure with passive reflective cells that can control the electromagnetic response of impinging radio-frequency (RF) signals, such as changes in phase, amplitude, or polarization. Indeed, RISs open up a new paradigm where the wireless channel-traditionally treated simply as an optimization constraint-plays an active role subject to optimization with the potential of increasing the energy efficiency of mobile networks by >50%.

A RIS can be implemented as an array of passive antenna elements that are not supported by full radiofrequency (RF) chains. Without loss of generality, the present disclosure focus on RISs that involve a grid of antennas or reflectors, each of them connected to a set of electronic devices and delay lines necessary to realize a phase shift of the received signal before reflection, as shown in FIG. 1. Each delay line is designed with a specific length that produces a specific phase shift into the reflected signal. The set of an antenna/reflector with all its components for the phase shifting creates a Unit Cell.

Such baseline RIS enables low-cost and simple yet configurable reflections (e.g., via passive beamforming) but make it impossible to make complex signal processing tasks (no baseband processing is possible) for, e.g., channel estimation, which would assist in automated configuration of the RIS. The inclusion of full RF chains on each antenna element would indeed enable ideal sensing capabilities but at a substantial cost and energy consumption (which is what a full transceiver and relays allow).

SUMMARY

In an embodiment, the present disclosure provides a reflective device includes a control element and an array of reflective elements. Each reflective element of the array of reflective elements has an antenna element and a phase shifter and is under control of the control element so as to reflect a radio-frequency (RF) signal incident on the each reflective element with an adjustable phase shift, wherein different phase shifts are realized by the phase shifter channeling the RF signal into a specific one of a number of different delay lines. Each of the different delay lines comprises an extension unit configured to extract a portion of a power of the RF signal channeled into the respective specific one delay line by the phase shifter and to measure or estimate the voltage, the current and/or the power of the extracted portion of the RF signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
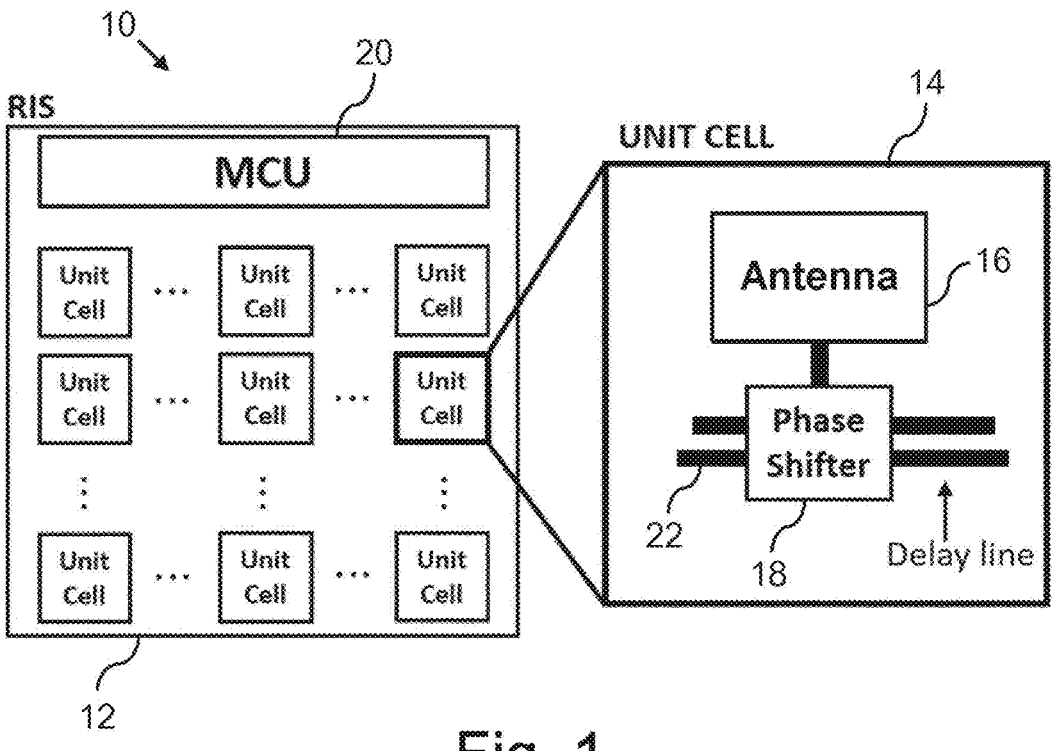
FIG. 1 is a schematic view illustrating the basic concept of RIS, in accordance with an embodiment of the present invention.

The project leading to this application has received funding from the European Union's Horizon 2020 research and innovation programme under the Marie Skłodowska-Curie grant agreement No 861222.

In accordance with an embodiment, present invention improves and further develops a reflective device and a method of the same in such a way that performing simultaneous passive beamforming and sensing operations is enabled without the use of costly and power-hungry RF chains.

In accordance with embodiments, the present invention provides a reflective device, comprising a control element and an array of reflective elements, wherein each reflective element comprises an antenna element and a phase shifter and is under control of the control element so as to reflect a radio-frequency, RF, signal incident on the reflective element with an adjustable phase shift, wherein different phase shifts are realized by the phase shifter channeling the RF signal into a specific one of a number of different delay lines, wherein one or more of the delay lines each comprise an extension unit configured to extract a portion of the power of the RF signal channeled into the respective one of the delay lines by the phase shifter and to measure or estimate the voltage, the current and/or the power of the extracted portion of the RF signal.

Furthermore, in accordance with another embodiment, the present invention provides a method of operating a reflective device comprising a control element and an array of reflective elements, wherein each reflective element comprises an antenna element and a phase shifter and is under control of the control element so as to reflect a radio-frequency, RF, signal incident on the reflective element with an adjustable phase shift, the method comprising: channeling, by the phase shifter, an RF signal into a specific one of a number of different delay lines to realize a specific phase shift; extracting, by an extension unit of the respective delay line, a portion of the power of the RF signal channeled into the respective delay line; and measuring or estimating, by one or more sensors, the voltage, the current and/or the power of the extracted portion of the RF signal.

According to embodiments, preferably, all of the delay lines of the reflective device, i.e. the delay lines of each of the reflective elements of the reflective device are equipped with an extension unit. The extension unit extract a (small) portion of the RF signal channeled into the associated delay line, wherein the extracted portions of the RF signals can be used for channel estimation. As such, embodiments disclosed herein provide a RIS design/configuration that enables limited, i.e., low-cost, yet useful, sensing capabilities that preserve phase information from each individual unit cells enabling novel operations such as self-configuring mechanism. It is important to note that embodiments of the RIS designs disclosed herein provide the limited sensing capabilities on a RIS without the need of full RF chains (which are costly and power-hungry) or expensive/complex electronic components or RF processing. The sensing capabilities provide the ability of the RIS to perform passive beamforming and to operate the RIS in a plug-and-play fashion, without a control channel with the rest of the network.

According to an embodiment, the extension unit may comprise an impedance placed at the end of the respective delay line and an RF signal transmission line connecting the impedance with a sensor capable of measuring or estimating the voltage, current and/or power of an RF signal.

According to embodiments, the sensors may be configured to provide their measurement results including the measured or estimated voltage, current and/or power of the extracted portion of the RF signal to the control element. To this end, the sensors may be suitably coupled with the control element, e.g., by means of a bus system. The control element may be configured to process in the received measurement results for performing channel estimation.

According to an embodiment, the impedance at the end of each delay line may be implemented in form of a purely resistive impedance load. Alternatively, it may be provided that the impedance is provided in the form of a varactor with a configurable impedance. This would allow to dynamically change the size of the portion of the RF signal extracted the respective extension unit.

According to embodiments, the length of the RF signal transmission line that connects the impedance with the sensor may be determined in such a way that the phase of the RF signal received at the sensor and the phase of the RF signal being reflected back to the antenna element are identical. In this way, the sensing of the power of the extracted RF signal is paired with the information on the applied phase-shift, which ensures that meaningful channel state information are obtained.

According to an embodiment, each extension unit may comprise its own sensor. This configuration has the advantage that no complex circuitry is required. However, the number of sensors, which scales with number of unit cells and the number of possible phase shifts configurable at each unit cell, is rather high. To address this issue, according to embodiments, it may be provided that the extension units belonging to the same reflective element or to a number of neighbored reflective elements are configured to share a common sensor.

According to yet another embodiment, all extension units across all reflective elements of the reflective device may connect to an RF bus, which aggregates the RF signals from all reflective elements in a common aggregation point to preserve phase information across the reflective elements. The aggregated RF signal from the aggregation point may then feed an RF power sensor, which is configured to communicate its measurement results to the control element. In order to ensure proper sensing operation and to avoid any undesired phase delays, the RF signal transmission lines of the extension units may each terminate in an RF switch element, which lets the RF signal pass through or not depending on the configuration of the respective phase shifter, thereby providing isolation across unit cells.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawing Embodiments disclosed herein are directed to RIS configurations with sensing capabilities that preserve phase information from each individual unit cell of the RIS, thereby enabling novel operations such as a self-configuring mechanism. In contrast to prior art solutions, in which RIS, in order to infer and self-configure its beamforming parameters, are equipped with baseband processors or RF chains, RIS according to embodiments of the present invention are configured to gather channel state information passively, i.e. without any baseband processors or RF chains. The RIS according to embodiments of the present invention provides the advantages of low power consumption, minor additional costs, and negligible degradation of the beamforming operations of the RIS.

FIG. 1 is a schematic view illustrating the basic RIS concept. According to this concept, the RIS 10 comprises a surface 12 including an array of reflective elements or unit cells 14 (both terms are sometimes used interchangeably in the present disclosure), wherein each unit cell 14 includes an antenna element (ANT) 16 and a phase shifter 18, connected via feed line 30. The RIS 10 is under control of a control element-microcontroller unit (MCU) 20—that communicates directly to the phase shifters 18 on the unit cells 14.

One of the most important applications of a RIS 10 is to realize passive beamforming onto reflected signals: reflected energy can be maximized towards the direction of a user, in a manner programmable via the MCU 20. To this end, the array of unit cells 14 applies different phase shifts to the signals each of them reflects. These electromagnetic waves constructively interfere in a specific direction and they generate a sufficiently narrow beam to serve the selected user without meddling with unwanted devices. No signal processing or amplification devices are involved, but only essential and low power circuit components, i.e., passive beamforming. Different phase shifts are realized via a number of different delay lines 22 of the phase shifter 18, each with its own specific length.

According to embodiments, a portion of the power received by each antenna/reflector of the RIS is extracted during the reflection process for channel sensing purposes. In this way, the RIS can still realize beamforming and concurrently evaluate the reflected power for different steering angles (beamforming configurations). Extraction of a specific portion of received power may be performed by the application of a specific phase shift in each unit cell.

Figure 2:
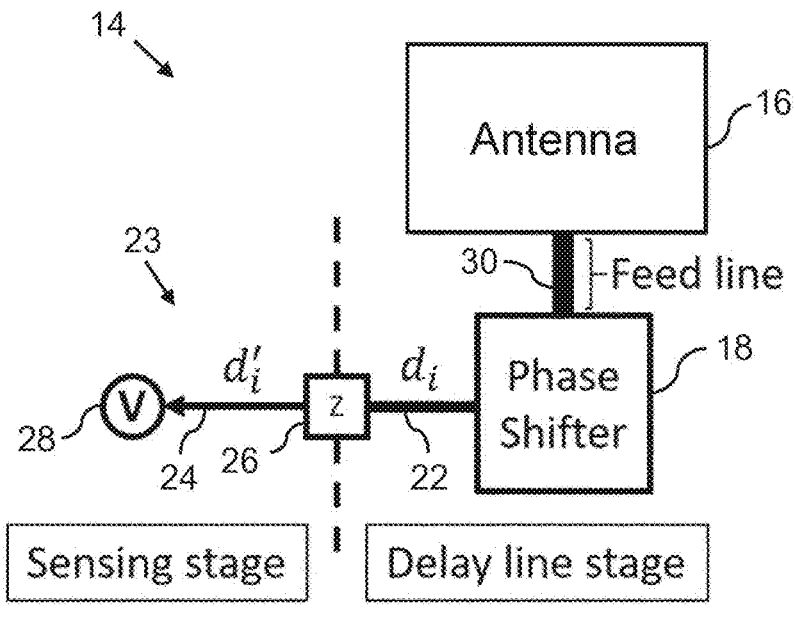
FIG. 2 is a schematic view illustrating sensing and delay line stages of a RIS unit cell, in accordance with an embodiment of the present invention.

FIG. 2 illustrates a unit cell 14 of a RIS that implements this concept in accordance with an embodiment. Each of the delay lines 22 (sometimes also denoted 'delay line stage' herein) of the unit cell's 14 phase shifter 18—for the sake of simplicity, only a single delay line 22 is shown in FIG. 2—is extended by an extension unit 23, which forms an additional second stage, namely a 'sensing stage'. Once a received signal is channeled in the delay line stage 22 to produce a phase shift onto the reflected signal, a fraction of the energy of the signal is redirected towards this sensing stage.

In the embodiment illustrated in FIG. 2, the delay line stage 22 and the extension unit/sensing stage 23 are delimited from each other by a purely resistive impedance load 26 placed at the end of the delay line 22 and thus forming a border (as indicated by the dashed line in FIG. 2) between the two stages 22, 23. Alternatively, a varactor with a configurable impedance could be used instead. A configurable impedance would enable dynamically varying the amount of power split between the extension unit 23 and the reflected signal in the delay line 22.

It should be noted that, if the delay line 22 is open-ended, as it is the common state-of-the-art for RIS, then all the incoming power is reflected, which is the goal of current RIS designs. In contrast to that, according to embodiments disclosed herein and as exemplarily shown in FIG. 2, the impedance load 26 only reflects (100–K)% of the energy of the signal, wherein K is the portion taken for sensing. This separation is highlighted by the dashed line in FIG. 2.

According to embodiments and as also shown in FIG. 2, the extension unit 23 comprises an RF signal transmission line 24, e.g. a strip line or a microstrip, that connects the impedance with a sensor 28. In the illustrated embodiment, the sensor 28 is a sensor that is capable of estimating or measuring the voltage, current and/or power of the incoming RF signal. Since the portion K extracted for sensing is known, the amount of energy reflected could be inferred, accordingly. This information may then be sent to the RIS's 10 micro-controller unit (MCU) 20 for processing.

Depending on the situation and/or constrains, the extension unit 23 can be designed differently, as will be described hereinafter with reference to the embodiments illustrated in FIGS. 3-5.

Properly calculating the length $d_i'$ of the RF signal transmission lines 24 of the extension units 23 (i.e. from the impedance terminating the delay line 22 to the sensor 28) is key to a successful design. According to embodiments, in order to obtain meaningful channel state information, the power RF sensing may be paired with the information on the applied phase-shift. Hence, the goal is that the sensor 28 receives an RF signal with identical phase as that of the RF signal being reflected back to the antenna 16. If a phase shift equal to X° is intended, $d_i$ can be calculated as:

$$X^\circ = \frac{(360 \cdot 2d_i)}{(\lambda \cdot v_f)}$$

where $\lambda$ is the wavelength of the desired frequency and $v_f$ is the velocity factor of the transmission lines in the delay line stage 22. Hence, $d_i'$ is set as:

$$X^\circ = \frac{(360 \cdot (d_i + d_i'))}{(\lambda \cdot v_f)}.$$

According to embodiments, the present invention provides a RIS configuration in which a RF signal transmission line (e.g., a stripline, a microstrip or any other suitable connection) connects an impedance Z of each existing delay line of a unit cell to a device able to return an instantaneous voltage or current value, given an input RF signal. For instance, FIG. 3 illustrates such configuration for a RIS unit cell 14 with a 2-bit phase shifter 18. Accordingly, the unit cell 14 comprises four delay lines 22 (d1, . . . , d4), each comprising an associated extension unit 23. Each of the extension units 23 comprises its own sensor 28, e.g. an RF voltage or current detector. A respective RF transmission line 24 (d'1, . . . , d'4), connects the sensors 28 with the impedances 26 that terminate the respective delay lines.

In embodiments, the length of each transmission line 24 in the sensing stage/extension unit 23 is calculated in such a way that the RF signal will reach the RF voltage/current detector 28 with the same phase intended by its respective delay line 22. Finally, the output of each RF voltage detector 28 is then sent to the MCU 20, which can process the values coming from all unit cells 14 for channel estimation.

Figure 3:
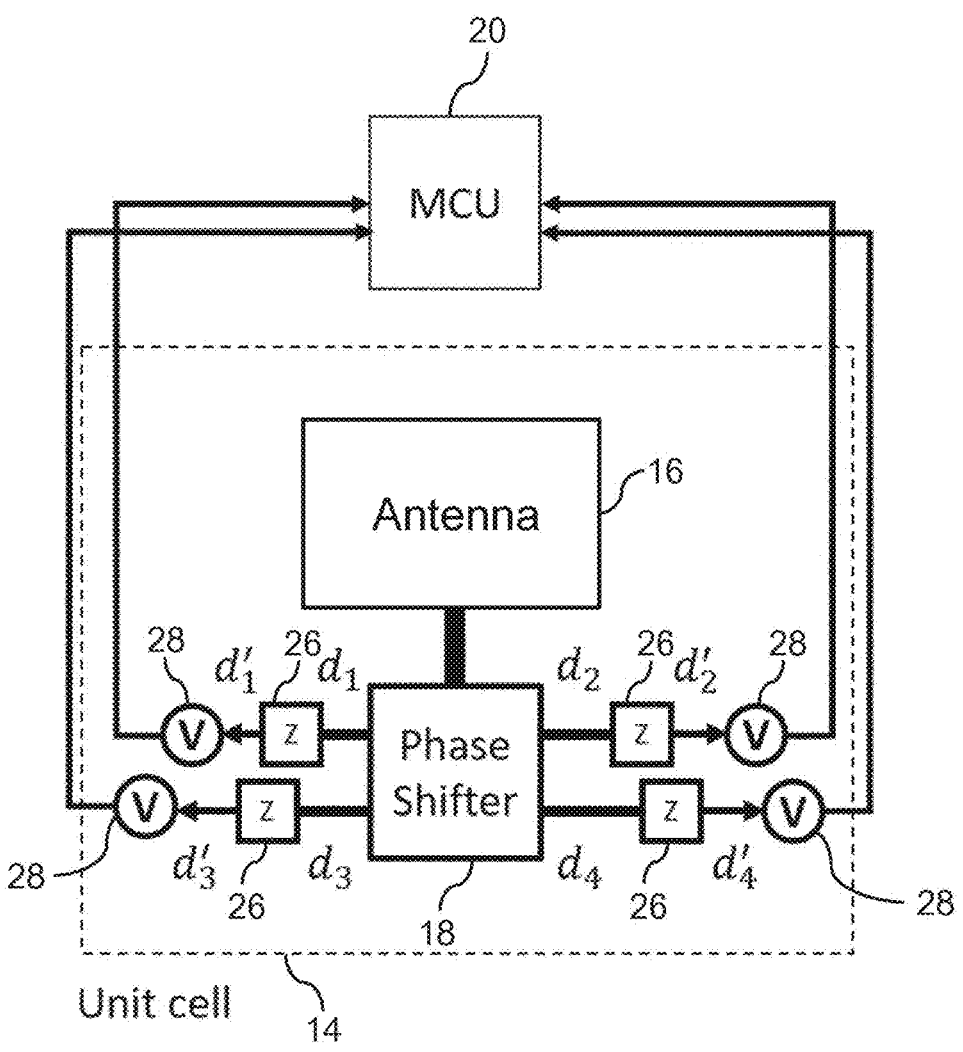
FIG. 3 is a schematic view illustrating a RIS unit cell with an RF volt detector per delay line, in accordance with an embodiment of the present invention.

Unfortunately, the number of RF voltage/current detectors 28 in the embodiment illustrated in FIG. 3 scales with the number of unit cells 14 and the number of possible phase shifts configurable at each unit cell 14. Commercial RF voltage/current detectors are usually expensive, bulky, they may require extra equipment for signal analysis, such as a vector network analyzer, and operate in limited regimes, which may render this configuration not viable in some scenarios of interest. For instance, in a 2-bit phase shift based 10×10 RIS, 400 RFvoltage/current detectors 28 and 400 direct connections to the MCU 20 may be required.

Figure 4A:
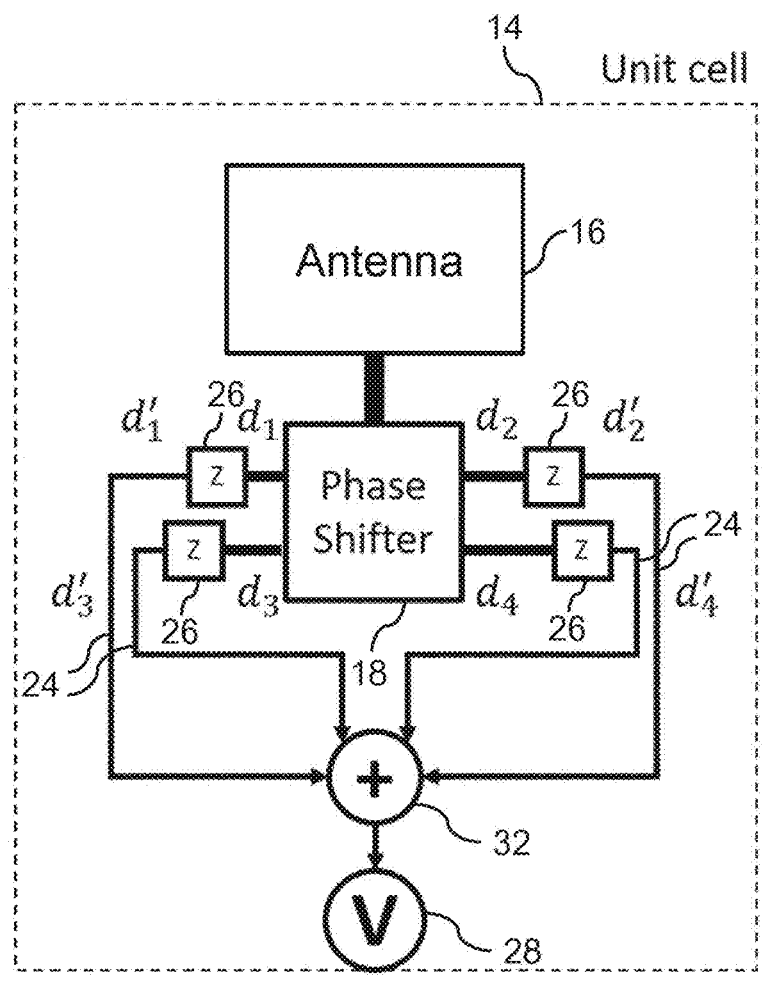
FIG. 4a is a schematic view illustrating a RIS unit cell with a common RF log detector, in accordance with an embodiment of the present invention.
Figure 4B:
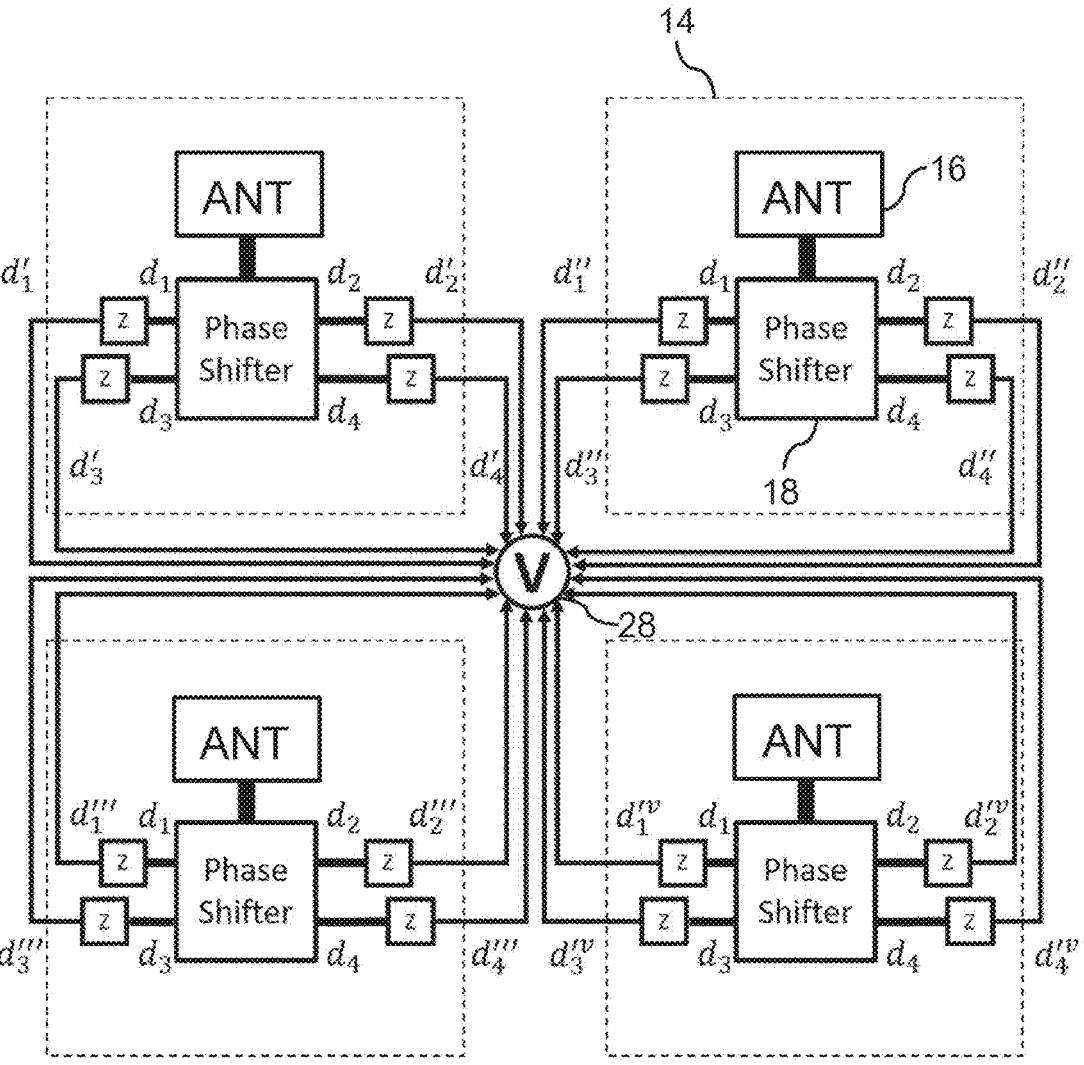
FIG. 4b is a schematic view illustrating a RIS unit cell with a cluster of unit cells sharing a common volt detector, in accordance with an embodiment of the present invention.

According to embodiments addressing this issue and as also exemplarily shown in FIG. 4, the present invention provides a RIS configuration in which the RF signal transmission lines 24 of a plurality of extension units 23 (of a single unit cell 14 as shown in FIG. 4*a* or of a number of different unit cells as shown in FIG. 4*b*) converge in an aggregation point 32 with a single RF voltage/current detector 28. As in the previous embodiment described in connection with FIG. 3, the detector 28 may be configured to provide the measurement data to the MCU 20 of the respective RIS 10. A single unit cell 14 or a plurality of (neighbored) unit cells 14 may in this way rely on a single RF voltage/current detector 28. FIG. 4 exemplarily illustrates the concept for the case of RIS unit cells 14 with 2-bit phase shifters 18. However, as will be appreciated by those skilled in the art, the concept may likewise be implemented for RIS unit cells with more sophisticated phase shifters, e.g. 4-bit phase shifters.

Similarly as described above in connection with the embodiment of FIG. 3, calculating the lengths of all the RF signal transmission lines 24 in the respective extension units 23 is vital. Hence, although allowing more unit cells to share common detectors helps reducing cost (lower number of detectors), it implies a considerable increase in the complexity of the circuitry may be required to connect the sensing stages with the detector. This trade-off is illustrated in FIG. 4a, where a shared detector 28 is provided per each unit cell 14, and 4b, where four unit cells 14 share a single detector 28.

According to embodiments of the present invention, certain mechanisms or components are provided that ensure that RF signals across the sensing stages 23 of different unit cells 14 do not interfere with each other. To this end, although not explicitly shown in FIG. 4, additional components such as diodes acting as switches may be placed on the RF signal transmission lines 24 (which may be implemented, e.g., in form of microstrips) in the sensing stages 23.

As explained above, the embodiments described in connection with FIG. 4 substantially reduce the amount of RF voltage/current detectors. However, the detectors of that type, which, as mentioned earlier, are rather expensive, is not entirely omitted. Accordingly, embodiments of the present invention, illustrated in FIG. 5, aim at providing RIS configurations that deploy a more cost-effective type of detectors.

In accordance with these embodiments, the present invention provides a RIS configuration that leverages on RF power detectors 34, which are more common in the industry, cheaper and smaller than RF voltage/current detectors. Unfortunately, measuring solely power in the sensing stages of each unit cell or in a cluster of unit cells ignores vital phase information across unit cells. This loss of information proves to be disadvantageous since one is interested in the power response of the RIS as a whole, in particular in order to perform channel estimation. In contrast to pure RF power detectors, voltage or current measurements, as used in the embodiments of FIGS. 3 and 4, preserve phase information and, hence, that data can be collected from individual cells. Thus, according to an embodiment of the invention, for the approach with only RF power detectors 34 to work properly, all sensing stages in the RIS are configured to have a single point of aggregation 36 to preserve phase information across unit cells 14.

Figure 5A:
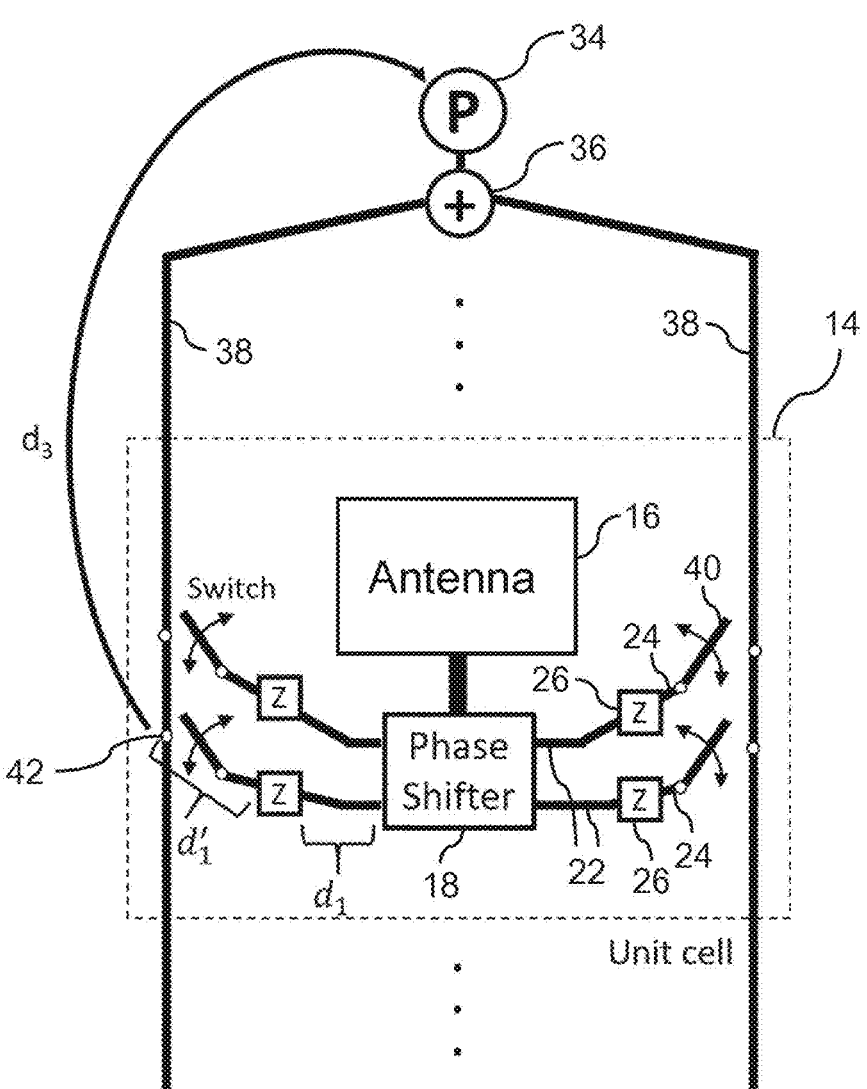
FIG. 5a is a schematic view illustrating a RIS unit cell with a switch and RF bus approach, in accordance with an embodiment of the present invention.

According to embodiments of the invention, a RIS configuration is provided where, as shown in FIG. 5a, in the sensing stage, the signal handled by each unit cell 14 will travel through an RF-line 24 in the sensing stage of that unit cell 14 until it merges with an "RF-bus" 38. The connection between the RF-line 24 and the RF-bus 38 is regulated by a device acting as a switch 40. This function can be carried out by an RF-switch or by other similar devices, e.g., pin diodes. The role of these switches 40 is fundamental, because they provide isolation across unit cells. Without such isolation, the signals would travel through inactive branches that would add undesired phase delays, disrupting the intended sensing operation.

Figure 5B:
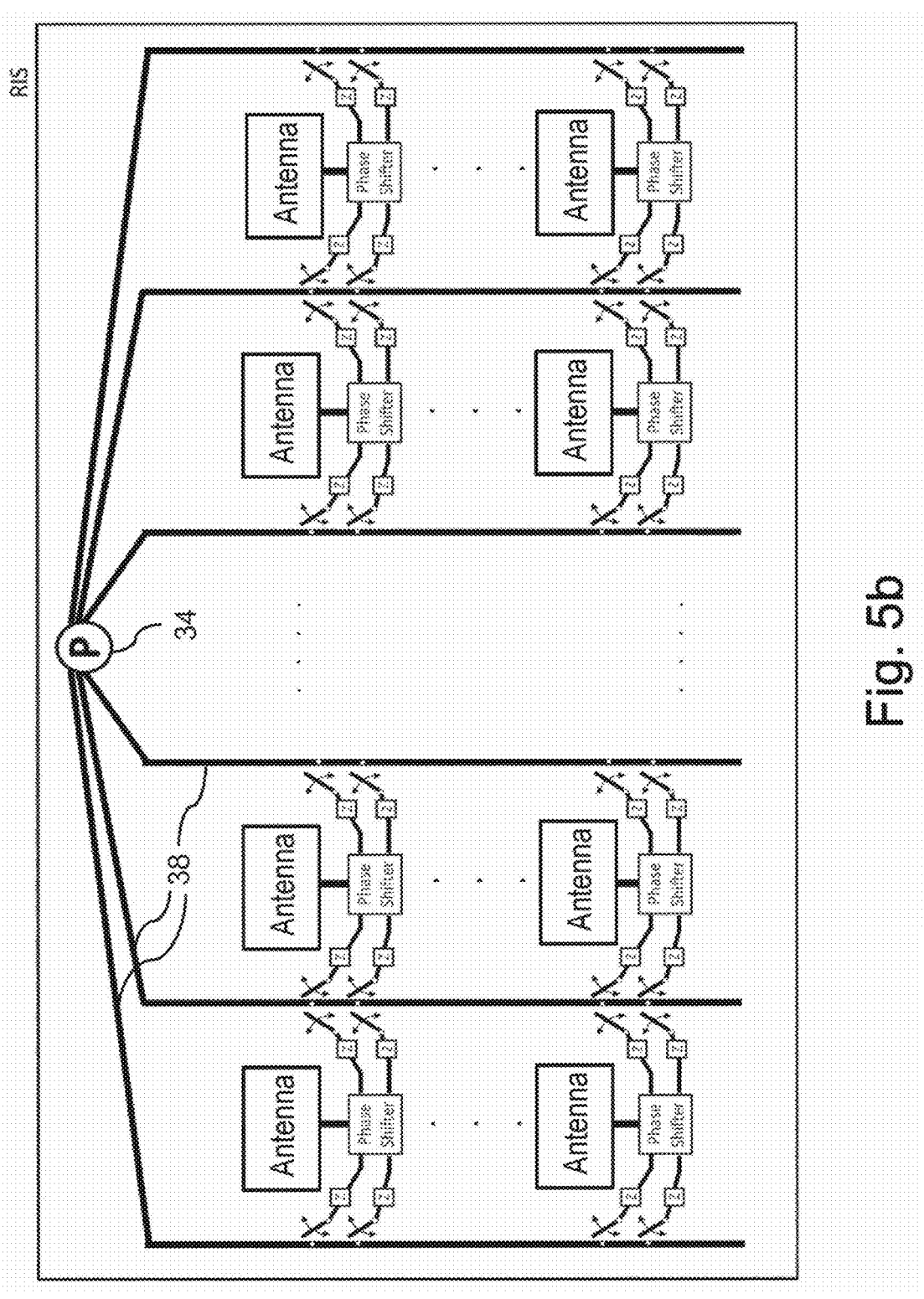
FIG. 5b is a schematic view illustrating a RIS unit cell full view for the embodiment of FIG. 5a, in accordance with an embodiment of the present invention.

As depicted in FIG. 5b, for efficient handling, an RF-bus 38 may be deployed between two columns of unit cells 14, thus connecting all the left-most RF-lines 24 of a respective right column and all the right-most RF-lines 24 of a respective left column. All the RF-buses 38 converge in one point where the power of the aggregated signals is measured by means of a common RF power detector 34.

Furthermore, in order to ensure that all the signals are converging coherently into the detector 34, it is vital to assure that the total length of the path from the beginning of the delay line to the power detector 34, exemplarily denoted in FIG. 5a as $d=d_1+d_1'+d_3$ (where $d_1$ denotes the length of the delay line 22, $d_1'$ denotes the length of the RF transmission line 24 of the associated extension unit 23, and $d_3$ denotes the length along the RF-bus 38 from the respective switching point 42 to the detector 34), is a $2\pi$ multiple of the minimum length, d1, meaning $d=N*2\pi*d_1$, with N being an integer. The measured value then can be sent to the MCU of the RIS and used for channel estimation.

According to embodiments, the present disclosure describes low-cost sensing capabilities for Reconfigurable Intelligent Surfaces (RIS) preserving phase information from each individual unit cell. As described herein, in a first approach the RIS may use a sensing branch comprised of one RF voltage/current sensor for every phase shift configuration enabled by a phase shifter. According to this approach, the energy of the RF signal in the sensing stage travels through a delay line, which is terminated by an RF current/voltage sensor. The length of the delay line is precisely calculated to preserve phase information. Measurement sample is then communicated to an MCU for processing.

According to a second approach described herein, the RIS may use a sensing branch comprised of one RF voltage/current sensor for every unit cell or for a cluster of unit cells. According to this approach, the energy of the RF signal in the sensing stage travels through a delay line, which is terminated by an RF aggregation where the RF signal of all the sensing stages in a unit cell is added up. The length of the delay line is precisely calculated to preserve phase information. The aggregated RF signal then feeds an RF voltage/current sensor, which then communicates the sensing data to an MCU.

According to a third approach described herein, the RIS may use an RF power sensor for each RIS board. According to this approach, the energy of the RF signal in the sensing stage travels through a delay line, which is terminated by an RF switch (or an RF relay), which lets the RF signal through (on state) or not (off stage) depending on the phase shifter configuration. All the sensing stages across all unit cells may connect with an RF bus, which eventually aggregates the RF signals from all unit cells in a common point in the RIS. The lengths of all the delay lines and RF buses are precisely calculated to preserve the phase information of each individual RF signal at the aggregation point. The aggregated RF signal then feeds an RF power sensor, which then communicates the sensing data to an MCU.

According to embodiments, the sensing-capable RIS described herein may comprise a matrix of unit cells, each with an antenna element that captures RF signals in a specific frequency and bandwidth. For every unit cell, it may be provided that:

1) RF signal travels through a RF transmission (e.g., microstrip) line to a phase shifter with N possible configurations (phase shifts).

2) Given one phase shifter configuration, RF signal travels through a delay line with a length precisely calculated to provide a pre-determined phase shift (delay line stage).

3) The delay line stage is terminated by a resistive impedance or a varactor or similar component, which reflects a portion of the energy of the RF signal back to the phase shifter and then the antenna element with sends it out into the air. The remaining portion of the energy follows on a sensing stage.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A reflective device, comprising:
a control element; and
an array of reflective elements, wherein each reflective element of the array of reflective elements comprises an antenna element and a phase shifter and is under control of the control element so as to reflect a radio-frequency (RF) signal incident on the each reflective element with an adjustable phase shift, wherein different phase shifts are realized by the phase shifter channeling the RF signal into a specific one of a number of different delay lines;
wherein one or more of the different delay lines each comprise an extension unit configured to extract a portion of a power of the RF signal channeled into the respective specific one delay line by the phase shifter and to measure or estimate the voltage, the current and/or the power of the extracted portion of the RF signal.

2. The device according to claim 1, wherein the extension unit comprises:
an impedance placed at an end of the respective specific one delay line; and
an RF signal transmission line connecting the impedance with a sensor capable of measuring or estimating the voltage, current and/or power of an RF signal.

3. The device according to claim 2, wherein the sensors is configured to provide their measured or estimated voltage, current and/or power of the extracted portion of the RF signal to the control element.

4. The device according to claim 3, wherein the control element is configured to process the measured or estimated voltage, current and/or power values from all reflective elements for channel estimation.

5. The device according to claim 2, wherein the impedance is implemented as in form of a purely resistive impedance load.

6. The device according to claim 2, wherein the impedance is implemented as a varactor with a configurable impedance.

7. The device according to claim 2, wherein a length of the RF signal transmission line connecting the impedance with the sensor is determined in such a way that a first phase of the RF signal received at the sensor and second phase of the RF signal being reflected back to the antenna element are identical.

8. The device according to claim 2, wherein each extension unit comprises a second sensor.

9. The device according to claim 2, wherein extension units belonging to the same reflective element or to a number of neighbored reflective elements are configured to share a common sensor.

10. The device according to claim 1, wherein all extension units across all reflective elements of the array of reflective elements connect to an RF bus, which aggregates the RF signals from all reflective elements of the array of reflective elements in a common aggregation point to preserve phase information across the array of reflective elements.

11. The device according to claim 10, wherein the aggregated RF signal from the aggregation point feeds an RF power sensor, which is configured to communicate measurement results to the control element.

12. The device according to claim 10, wherein the RF signal transmission lines of the extension units each terminate in an RF switch element, which lets the RF signal pass through or not based on a configuration of the respective phase shifter.

13. A method of operating a reflective device comprising a control element, and an array of reflective elements, wherein each reflective element of the array of reflective elements comprises an antenna element and a phase shifter and is under control of the control element so as to reflect a radio-frequency (RF) signal incident on the each reflective element with an adjustable phase shift, the method comprising:
channeling, by the phase shifter, an RF signal into a specific one of a number of different delay lines to realize a specific phase shift;
extracting, by an extension unit of the respective specific one delay line, a portion of the power of the RF signal channeled into the respective specific one delay line; and
measuring or estimating, by one or more sensors, the voltage, the current and/or the power of the extracted portion of the RF signal.

14. The method according to claim 13, further comprising:
providing, by the one or more sensors, the measured or estimated voltage, current and/or power of the extracted portion of the RF signal to the control element.

15. The method according to claim 14, further comprising:
processing, by the control element, the measured or estimated voltage, current and/or power values from all reflective elements of the array of reflective elements for channel estimation.

* * * * *